US009916147B2

(12) United States Patent
Huang et al.

(10) Patent No.: US 9,916,147 B2
(45) Date of Patent: Mar. 13, 2018

(54) DEPLOYMENT OF A TOOL FOR TESTING MIGRATED APPLICATIONS

(75) Inventors: Hai Huang, White Plains, NY (US); Nikolai A. Joukov, Thornwood, NY (US); Birgit M. Pfitzmann, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 12/857,996

(22) Filed: Aug. 17, 2010

(65) Prior Publication Data
US 2012/0047492 A1 Feb. 23, 2012

(51) Int. Cl.
*G06Q 10/00* (2012.01)
*G06F 9/445* (2018.01)
*G06F 11/36* (2006.01)

(52) U.S. Cl.
CPC ............ *G06F 8/60* (2013.01); *G06F 11/3672* (2013.01)

(58) Field of Classification Search
CPC .............................. G06F 11/3672; G06F 8/60
USPC ......................................................... 717/128
See application file for complete search history.

(56) References Cited

U.S. PATENT DOCUMENTS

| 6,269,447 | B1* | 7/2001 | Maloney | G06Q 10/06 717/124 |
|---|---|---|---|---|
| 6,662,357 | B1* | 12/2003 | Bowman-Amuah | 717/120 |
| 7,356,679 | B1* | 4/2008 | Le et al. | 713/1 |
| 7,376,722 | B1* | 5/2008 | Sim | H04H 60/31 709/223 |
| 7,406,516 | B2* | 7/2008 | Davis | G06F 11/3495 709/224 |
| 2002/0174329 | A1* | 11/2002 | Bowler | G06F 9/4451 713/1 |
| 2004/0073889 | A1* | 4/2004 | Baecker et al. | 717/121 |
| 2004/0261053 | A1* | 12/2004 | Dougherty et al. | 717/101 |
| 2006/0023638 | A1* | 2/2006 | Monaco | H04L 43/022 370/252 |
| 2006/0059253 | A1* | 3/2006 | Goodman et al. | 709/223 |
| 2008/0010225 | A1* | 1/2008 | Gonsalves | G06N 7/005 706/11 |
| 2008/0097995 | A1* | 4/2008 | Dias et al. | 707/8 |
| 2009/0019420 | A1* | 1/2009 | Johnson | 717/101 |
| 2009/0228512 | A1* | 9/2009 | Chopra et al. | 707/102 |
| 2010/0114967 | A1* | 5/2010 | Yaniv | G06F 17/30371 707/785 |

(Continued)

OTHER PUBLICATIONS

An Approach to Testing COTS Software for Robustness to Operating System Exceptions and Errors—By Ghosh et al. Aug. 1999.*

(Continued)

*Primary Examiner* — Jonathan G Sterrett
(74) *Attorney, Agent, or Firm* — Scully, Scott, Murphy & Presser, P.C.; Louis J. Percello, Esq.

(57) ABSTRACT

Configuration information associated with software installed on a production system may be discovered. A script is automatically generated for capturing data traffic from and to the software installed on the production system using the configuration information. The script may be executed to capture data traffic of the software running on the production system. A migrated version of the software may be executed on a test system using requests extracted from the captured data traffic. The responses in the captured data traffic may be compared with responses from the migrated version of the software.

25 Claims, 3 Drawing Sheets

(56) References Cited

U.S. PATENT DOCUMENTS

| | | | | |
|---|---|---|---|---|
| 2010/0175063 | A1* | 7/2010 | Ciano et al. | 718/1 |
| 2010/0319060 | A1* | 12/2010 | Aiken | H04L 63/10 726/7 |
| 2011/0126197 | A1* | 5/2011 | Larsen | H04L 9/3213 718/1 |
| 2012/0047492 | A1* | 2/2012 | Huang et al. | 717/128 |
| 2012/0265959 | A1* | 10/2012 | Le et al. | 711/162 |

OTHER PUBLICATIONS

Live wide-area migration of virtual machines including local persistent state R Bradford, E Kotsovinos, A Feldmann . . .—Proceedings of the 3rd . . . , 2007—dl.acm.org.*
"Ethereal vs. Tcpdump: a comparative study on packet sniffing tools for educational purpose", F Fuentes, DC Kar—Journal of Computing Sciences in Colleges, 2005—dl.acm.org.*
A tcpdump Tutorial and Primer with Examples—Daniel Miessler https://danielmiessler.com/study/tcpdump/ Aug 5, 2006—A tcpdump primer, tutorial, and reference that gives you maximum packet carving in minimum time.*
ESTES, Migration Project Testing, 2000 Technologies Corporation, http://www.2000technologies.com/MigrationTesting.htm, 2004.
Seclists.org, Re: question about—E parameter decrypting esp packets , http://seclists.org/tcpdump/2009/q1/92, From: Michael Richardson <mcr ( ) sandelman ottawa on ca>, Date: Fri, Feb. 20, 2009 10:42:29-0500.
SSF TCP Regression Tests, SSF.OS.TCP Validation Tests, http://www.ssfnet.org/Exchange/tcp/tcpTestPage.html, 1999.
Web Test Tools, SoftwareQATest.com. Rick Hower, Website Test Tools and Site Management Tools, http://www.softwareqatest.com/qatweb1.html, 1996-2010.
LioNBRIDGE, VeriTest Unveils New Testing Solutions for the Government Market, http://www.lionbridge.com/lionbridge/en-US/company/news/veritest-unveils-new-testing-solutions-for-the-government-market.htm, 2004.
Microsoft/TechNet, Developing a Migration Test Plan: Active Directory, http://technet.microsoft.com/en-us/library/cc775762%28WS.10%29.aspx, 2003.
DataMigration Pro, How to Implement an Effective Data Migration Testing Strategy—Data Migration Pro Expert Content, Data Migration Pro, http://www.datamigrationpro.com/data-migration-articles/2009/11/30/how-to-implement-an-effective-data-migration-testing-strateg.html, 2009.
Reliable Penguin, Inc., Migration Testing on Windows XP With Hosts File, https://help.reliablepenguin.com/index.php?_m=knowledgebase&_a=viewarticle&kbarticleid=, 2008.
Data Migration Best Practices, http://partners.netapp.com/go/techontap/NGS_migration.pdf, 2006.
Ns-3 Tutorial, http://www.nsnam.org/docs/tutorial/tutorial_14.html, generated on Aug. 25, 2010.
Bit-Twist: Libcap-based Ethernet packet generator, http://bittwist.sourceforge.net/, printed on Aug. 25, 2010.
LHN,http://www.linuxhomenetworking.com/wiki/index.php/Quick_HOWTO_:_Ch31_:_Centralized_Logins_Using_LDAP_and_RADIUS, last modified on Apr. 15, 2010.
Migration Testing, http://www.bitpipe.com/detail/PROD/1104217421_749.html, printed on Aug. 25, 2010.
Syntel, Migration Testing: Ensuring Outcomes, http://www.syntelinc.com/uploadedFiles/Syntel/Solutions/Migration/SYNT_MigrationTest.pdf, 2008 (month not known).
Syntel, http://www.syntelinc.com/, printed on Aug. 25, 2010.
Acutest, Migration Assurance, http://www.acutest.co.uk/migration-assurance.html, printed on Aug. 25, 2010.
Data Center Migration Testing, Server Migration Testing—Anue, http://www.anuesystems.com/Solutions_EnterpriseWANApplications_DataCenterMigration.shtml, printed on Aug. 25, 2010.
HP, Migration Resources Guide, http://h21007.www2.hp.com/portal/download/files/unprot/Migration_resources_guide_v3.pdf, Oct. 2004 (see last page of document).
EMC, Data Center Consolidation Solutions, http://www.emc.com/solutions/business-need/infrastructure-consolidation-optimization/data-center-consolidation.htm, printed on Aug. 25, 2010.
EMC, Data Center Consolidation and Migration Solutions, EMC Consulting, http://germany.emc.com/services/consulting/infrastructure/expertise/infrastructure-consolidation.htm, printed on Aug. 25, 2010.
Platespin, Test Lab Automation, http://www.platespin.com/Solutions/TestLabAutomation.aspx, printed on Aug. 25, 2010.
Platespin, Continuous Server Optimization, http://www.platespin.com/Solutions/ServerConsolidation.aspx, printed on Aug. 25, 2010.

* cited by examiner

DEPLOYMENT OF A TOOL FOR TESTING MIGRATED APPLICATIONS

FIELD

The present application generally relates to computer systems, network management and migration of servers and/or data, and more particularly to deployment of a tool for testing migrated systems.

BACKGROUND

Migration of servers or applications involves moving the data and files from a source system to a target system, and configuring the target system and the appropriate configuration data associated with the servers or applications in the target system so that the migrated servers and/or applications run on the target system as they did on the source system. In order to ensure that the migrated servers or applications were properly installed on the target system, post-migration testing may be performed.

User acceptance tests (UAT) are one way of post-migration tests. However, they are time-consuming and depend strongly on application knowledge. Another way is comparing by duplicating traffic, e.g., splitting the traffic at routers in real time. However, such a change in a source network is often difficult to achieve, e.g., because the network is controlled by a different organization than the servers, or because network changes are strongly audited, or because the source system and the untested target system are not allowed to be in the same network segments.

BRIEF SUMMARY

A method and system for migration testing are provided. The method, in one aspect, may include discovering configuration information associated with software installed on a production system and automatically generating a script for capturing data traffic from and to the software installed on the production system using the configuration information. The method may also include capturing data traffic of the software running on the production system by executing the script. The method may further include running a migrated version of the software on a test system using requests extracted from the captured data traffic and comparing responses in the captured data traffic with responses from the migrated version of the software.

A system for migration testing, in one aspect, may include a script generating module operable to automatically generate a script for capturing data traffic from and to software installed on a production system. The script generating module may automatically generate the script based on configuration information associated with software installed on a production system. A processor may be operable to execute the script to capture data traffic of the software running on the production system. A storage module may be operable to store the captured data traffic.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
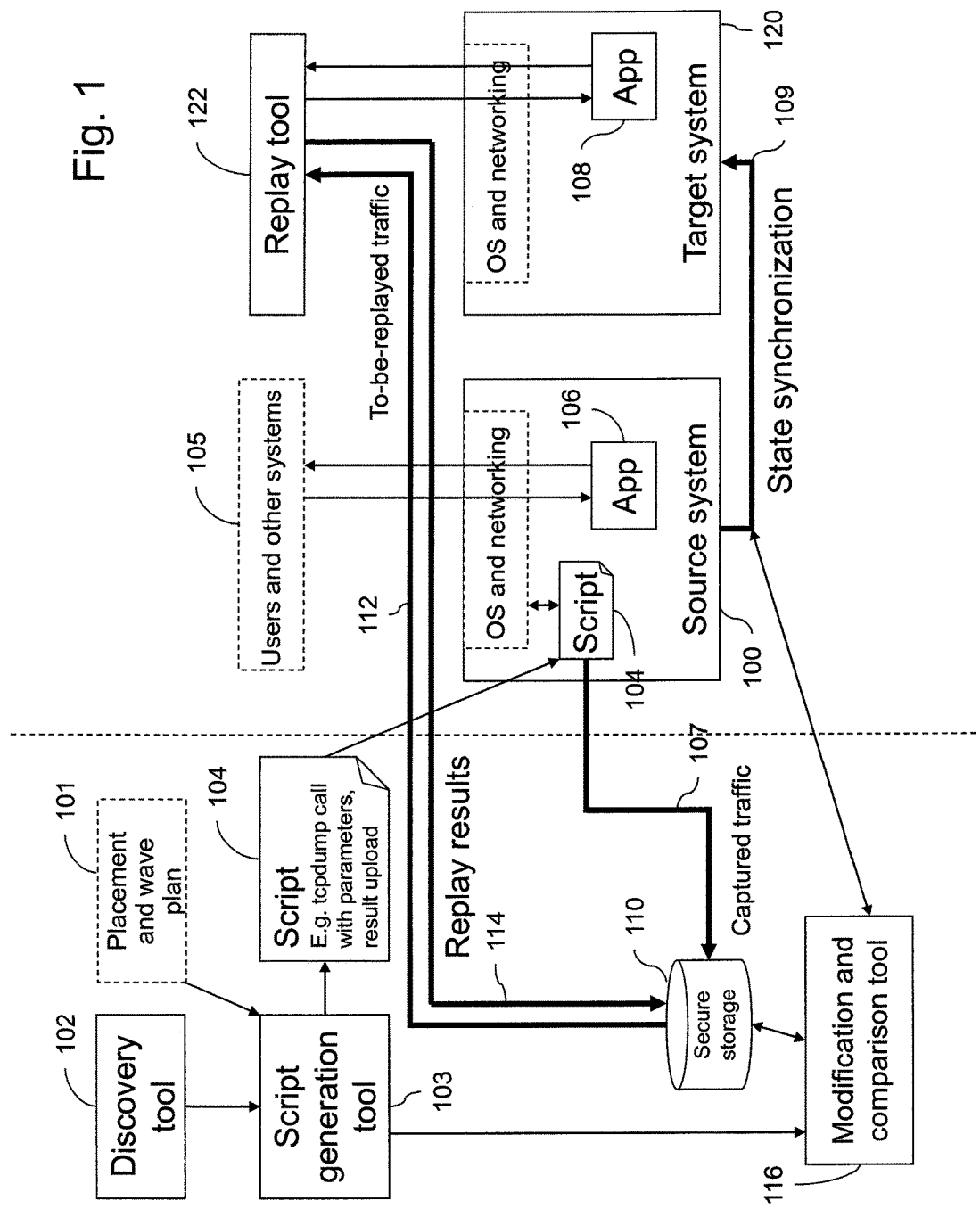
FIG. 1 is a diagram illustrating components in one embodiment of the present disclosure and logic flows among them.

A testing tool may speed up post-migration testing of applications by observing real user traffic and using it to drive the testing of applications. In particular, such a tool may store requests and replies coming to and from the production system, and later forward requests to the test system (typically a migrated replica of the production system) and compare the responses of the test and production systems. The forwarding may be done by out-of-band data transfer if the source system and the target system are not allowed to communicate in order to protect the source system.

In the present disclosure, minimally intrusive tools for testing migrated servers and/or applications or the like are presented. The system and methodology of the present disclosure presents a tool that SAs might be more prone to approve and use on their systems, by relying as much as possible on existing capabilities of the source servers, and only requiring additional running of small scripts. The benefit is that the smaller and the more readable the additional software used is, the easier it is for SAs or an audit, security, or compliance team to validate that the software does not harm the production systems. If, instead of a small readable script, a binary custom management and monitoring tool, especially binary code, were required on the source servers, the SAs or audit, security, or compliance teams would have no way to assess the ramifications of deploying this tool. Hence in a migration scenario it is almost impossible to get such a binary tool deployed.

The methodology of the present disclosure in one aspect generates safe and verifiable scripts for SAs to execute in their production environment for the purpose of collecting live data. This may be accomplished by having a mutually agreeable set of "safe" commands for the scripts to execute in the production environment. Clear and concise scripting allows an SA to understand exactly what the custom tool is doing. An aspect of the system and methodology of the present disclosure is that the script is automatically constructed from previously discovered data and potentially from migration plans. More complex versions of scripts may take into account compression, encryption, password replacement, and transferring out the final dataset.

Basic traffic capturing software used in the script may be already available on the systems for accumulating the traffic to and from a selected production application, so that for example, deployments of separate tool is not needed to capture the traffic. This facilitates passing SA validation and audit, because in fact the scripts will typically not be in the real-time production data processing path, except via the pre-existing tool. What the script does is only to configure the tool and potentially to post-process the captured data. An example of such basic traffic capturing software is "tcpdump". Briefly, tcpdump is a network analysis software utility that may be run under the command line. Tcpdump allows the user to intercept and display network packet data being transmitted or received over a network to which a computer is attached. In this example, system and methodology of the present disclosure in one embodiment automatically converts discovered data from the production environment and possibly placement and wave plans into a small script that calls tcpdump with suitable parameters to capture the necessary data for testing the migrated application, while minimizing unnecessary data capture.

After a time-out, for example, a predetermined time period, the capturing of the traffic may be stopped and the resulting captured traffic dump sent for test server operation testing. Testing may be performed "off-line". Testing may include replaying input traffic and comparing the resulting outputs with captured outputs, for instance, off-line. In one embodiment of the present disclosure, a system administrator or the like may issue traffic capturing commands, using the provided script.

FIG. 1 is a diagram illustrating components in one embodiment of the present disclosure and data flows among them. In one embodiment of the present disclosure, rather than installing a new tool or software on a system for performing collecting of data traffic, a script 104 is automatically generated that, for example, uses existing or already available or SA-approved methods to collect the data traffic. For automatically generating the script 104, information may be obtained using a discovery tool 102 and/or a placement and wave plan 101. A discovery tool collects data from system or software components to discover information about the system or software. For instance, a discovery tool may be used or executed to automatically discover information such as server configuration, the software components on the one or more servers that are migrated or to be migrated, the kinds of ports and/or port numbers that a software component is listening on such as user datagram protocol (UDP) port, transmission control protocol (TCP) port, socket port, the configuration file or files of a software components, dependencies between software components on this server and other software components or data on the same or other servers, and other information. Examples of discovery tools are IBM Tivoli® Application Dependency Discovery Manager and the Galapagos tool described in Nikolai Joukov, Murthy V. Devarakonda, Kostas Magoutis, Norbert G. Vogl: Built-to-Order Service Engineering for Enterprise IT Discovery. IEEE SCC (2) 2008: 91-98.

In addition, or optionally, placement and wave plans 101 may be analyzed or read to determine what enterprise applications are being migrated and various parameters specified for the migration and/or other configuration information. More precisely, a placement plan describes what source servers, software components, or enterprise applications are migrated to what target servers and what addresses or names and other parameters will change, while a wave plan describes which of the migrations out of a large migration project will take place when. A method for wave planning is described in Keith Athey, John K Baker, Ronda L Caswell, Steve N. Lee, Matthew A. Markley, Birgit Pfitzmann, Michael Tacci, Bruce G. Taylor, Tylon O. Willingham: System and method for object migration using waves, application Ser. No. 12/713,920, filed Feb. 26, 2010. An enterprise application refers to a collection of collaborating software components that provide a common service to users, e.g., a travel application including web servers, Java Enterprise Edition servers, messaging queuing software, and databases.

The script generation tool 103 uses these results to automatically construct a script 104 that will then automatically capture the appropriate data for post-migration testing. Hence, in one example, the script generation tool 103 may find in a wave plan that in the current wave, enterprise applications EAP1 and EAP2 are to be migrated. It then finds which software components on which servers belong to EAP1 and EAP2. It can do this either because this has already been written in machine-readable format in the placement and wave plan, or by using the discovery results to trace the enterprise applications, e.g., as described in Nikolai Joukov, Birgit Pfitzmann, HariGovind V. Ramasamy, Norbert G. Vogl, Murthy V. Devarakonda, Tryg Ager: ITBVM: IT Business Value Modeler; IEEE International Conference on Services Computing (SCC 2009), Bangalore, September 2009. In addition, the script generation tool 103 can use the same information sources to determine on which ports these software components listen, and, if one software component is used by multiple enterprise applications and those are not migrated at the same time, even which ports or other distinguishers such as uniform resource locators (URLs) are used for the traffic of each enterprise application.

The above information is used to automatically generate the script (or the like executable or runnable computer code or instructions) in 104, which contains which command(s) to invoke and which command parameter(s) should be used. In one aspect, the generated script should only contain commands and parameters that system administrators (or other users) have identified as "safe" to be run in their production environment. A list of "safe" commands and parameters may be pre-determined by system administrators. The restriction to the use of "safe" commands may be applied to the entire script or only to the part that captures the production traffic and could thus harm the production enterprise application, while post-processing of the captured traffic even on the same server may have fewer restrictions. For example, in some cases it may be required that production passwords be removed from the captured traffic before it is ever sent out in order to be replayed on a test system; this may require more complex logic but is not in the production traffic path.

For example, the "safe" command used to actually capture the production traffic may be a "tcpdmp" command. Other commands that a SA or the like user may approve may be utilized. The parameters to the "tcpdmp" command may be automatically generated from the information discovered at 102 by the script generation tool. For instance, it may have been discovered that traffic to a certain software component that is currently being migrated arrives at Internet Protocol (IP) address 1.2.34.567, using the TCP protocol and port 50050. Furthermore, assume that analysis of the discovery results yields that IP address 1.2.34.567 is configured on network interface eth1, from the information available in the results of discovery tools such as those cited above. Then the script generation tool 103 may generate the following line as part of script 104:

tcpdump -w trace.pcap -i eth1 tcp port 6881 or udp \(33210 or 33220 \)

If in addition it was discovered that the software component (or another software component belonging to the same enterprise application or the same wave) receives traffic with the UDP protocol on ports 33210 and 33220, then the line might look as follows:

tcpdump -w trace.pcap -i eth1 tcp port 6881 or udp \(33210 or 33220 \)

The script 104 or the like may also include commands to compress a part of all of the collected data, whether to encrypt a part or all of the collected data, whether to edit the collected data (for example, remove privacy or sensitive information). Data compression helps in reducing the volume of data collected. Features such as data encryption and removing sensitive information help in preserving the security of the system whose data is being collected. For instance, data such as passwords being communicated may be extracted and substituted with tags. Note that if tagging is done, then later before replay the modification and comparison tool 116 replaces these tags with other passwords or the like to be used in the test system, the state synchronization 109 sets up the target system such that it accepts these test passwords, and in the comparison step the modification and comparison tool 116 ignores potential changes between captured traffic from the source and target systems that are those it made itself earlier.

The script 104 is executed or run on a source system 100, and monitors the application 106 or the like on the source system 100 to capture traffic data. In the concrete example with tcpdump, the actual component that captures the traffic is the tcpdump utility which already existed on the source system 100, hence the script 104 is shown as interacting with the OS (operating system) and networking stack on source system 100. The captured traffic data 107 may be stored in storage 110; such a data transfer is typically part of the same script 104 and was put there by the script generation tool 103, based on the configuration of the analysis system, i.e., the address of the secure storage component 110. In cases where no network connection is possible between the source system (because it is a production system) and any storage shared with an analysis or test system, the initial storage may only be internal to the source system 100 (such as the file "trace.pcap" in the above example) and an SA may copy the captured traffic 107 out. The instructions for this may come in an email or similar communication to the SA that may also be automatically generated by the script generation tool 103, and which instructs the SA, e.g., in a few lines, how to run the script.

A modification and comparison tool 116 may modify the captured traffic 107 on the secure storage 110 before replay. It may change IP addresses or DNS names in the traffic if the placement and wave plan indicates that the software components belonging to the current wave (such as application 106, when migrated into application 108) change their IP addresses and/or DNS names. In one aspect, the script 104 on the source system 100 may make the minimum changes required to get permission to send traffic out of the source system, while all other changes may be made outside the source system 100, for example, in the modification and comparison tool 116. The modification and comparison tool 116 may also strip out all out outgoing traffic (i.e., traffic that came from application 106 to the users and other systems 105) and only retain incoming traffic (i.e., traffic that came from the users and other systems 105 to the application 106) for forwarding as to-be-replayed traffic 112. The secure storage retains the outgoing traffic for later comparison. Thus, in one embodiment, the modification and comparison tool 116 may separate incoming traffic from outgoing traffic and keep them separately.

A target system 120, also called test system, or other system having the migrated application 108 that is like application 106 may be synchronized with the production system, as shown in the state synchronization dataflow 109. For example, persistent data such as database and file systems that the software components of a migrated enterprise application use are synchronized for running the migrated application 108 on the target system 120. In one aspect, the state synchronization 109 captures the state of the source system at the beginning of the data capture, so that the target system will start in the same state once the traffic replay starts. In other words, in one aspect, state synchronization 109 happens before the script 104 is actually started, and there may be a brief down-time of the source system 100 or at least application 106 while resynchronization of last changes is done before system operation is resumed.

A replay tool 122 obtains the to-be-replayed traffic 112 from the storage 110 (with the modifications that the modification and comparison tool 116 may have made). It replays this to-be-replayed traffic for the target system 120 and thus to run the migrated application 108. Thus, it simulates the role that the users and other systems 105 played for the source system 100 For example, requests captured from the running of the application 106 in the production system are used (replayed) as requests to the migrated application 108. Responses from the migrated application 108 responding to the replayed requests are extracted and stored in correct sequence with the requests. The modification and comparison tool 116 compares these replay results 114 with the captured traffic 107. It takes into account modifications it made, e.g., IP address changes; these same replacements may also occur in the responses.

Figure 2:
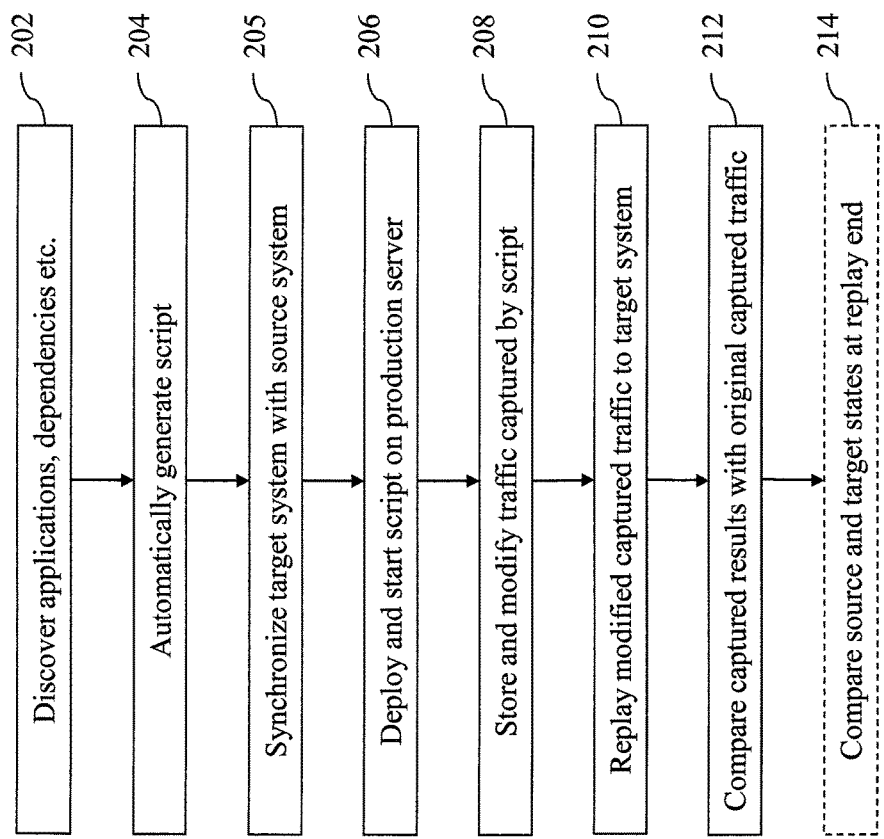
FIG. 2 is a flow diagram that illustrates a method and data flow of the present disclosure in one embodiment.

FIG. 2 is a flow diagram illustrating method logic of the traffic replaying steps of the present disclosure in one embodiment. At 202, configuration information about the application or server or the like being migrated is determined automatically, for instance, by using automated discovery tools that collect data about system and/or software components. Optionally, migration placement and wave plans may be analyzed to determine the configuration information. At 204, a script is automatically generated for collecting traffic data of the application running on a production system, i.e., the system from which the application is being migrated. At 205, the target system is synchronized with the source system, i.e., it obtains a well-defined state of the source system. Immediately after that (i.e., without any non-captured traffic in between), at 206, the script is executed on the production system to capture the data traffic of the running application.

At 208, the captured data is stored and possibly modified. The modification may include modifications needed to obtain permission to send the data out of the target system, such as encryption or, more complex, password replacement by tags, compression, and, on the side of the storage, replacement of addresses and names that change in migration as well as filtering out of the requests for replaying. In one embodiment, the target system will reuse the same addresses as the source system so that the addresses do not require modifications. This can be seen from the placement plan. In such a case, the target system is in an isolated environment behind a firewall so that the duplication of addresses does no harm; this is not a problem because typically the target system during test is run in an isolated environment anyway.

At 210, the captured traffic data is replayed on a migrated application. This step includes replaying the captured requests (which were already filtered out in Step 208), and capturing the responses from the migrated application run in the target environment.

At 212, comparison is made between the captured traffic from the source and target systems. The captured response of the application running in the source system are compared with responses from the migrated application running on the target system to determine and/or ensure that the migrated application in the target system behaves the same or substantial the same way, e.g., correctly, as it was in the source system. In one aspect, such a mechanism may provide for simpler tests that exploit the knowledge or assumption that the source system was correct and the target system should show the same or substantially the same behavior as the source system.

Optionally, at 214, the state of the source system 100 at the end of the traffic capturing period and the state of the target system 120 at the end of the traffic replaying period are also compared. This is particularly useful if the source system contains many state updates that might not immediately be visible by other requests, e.g., if there are multiple databases and many write operations are made and the read requests made during the traffic capturing period might not fully reflect whether the writes work correctly. Referring to FIG. 1, this may include that another state synchronization of the source system 100 to some secure storage is made at the end of the traffic capturing period, and the state of the target system at the end of the replay period is also captured, and these two states are compared.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Parts of the program code may execute on the source and target servers of the migration, in particular the script 104 may be executed on the source server(s), and so may be at least part of the discovery tool 102.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

Figure 3:
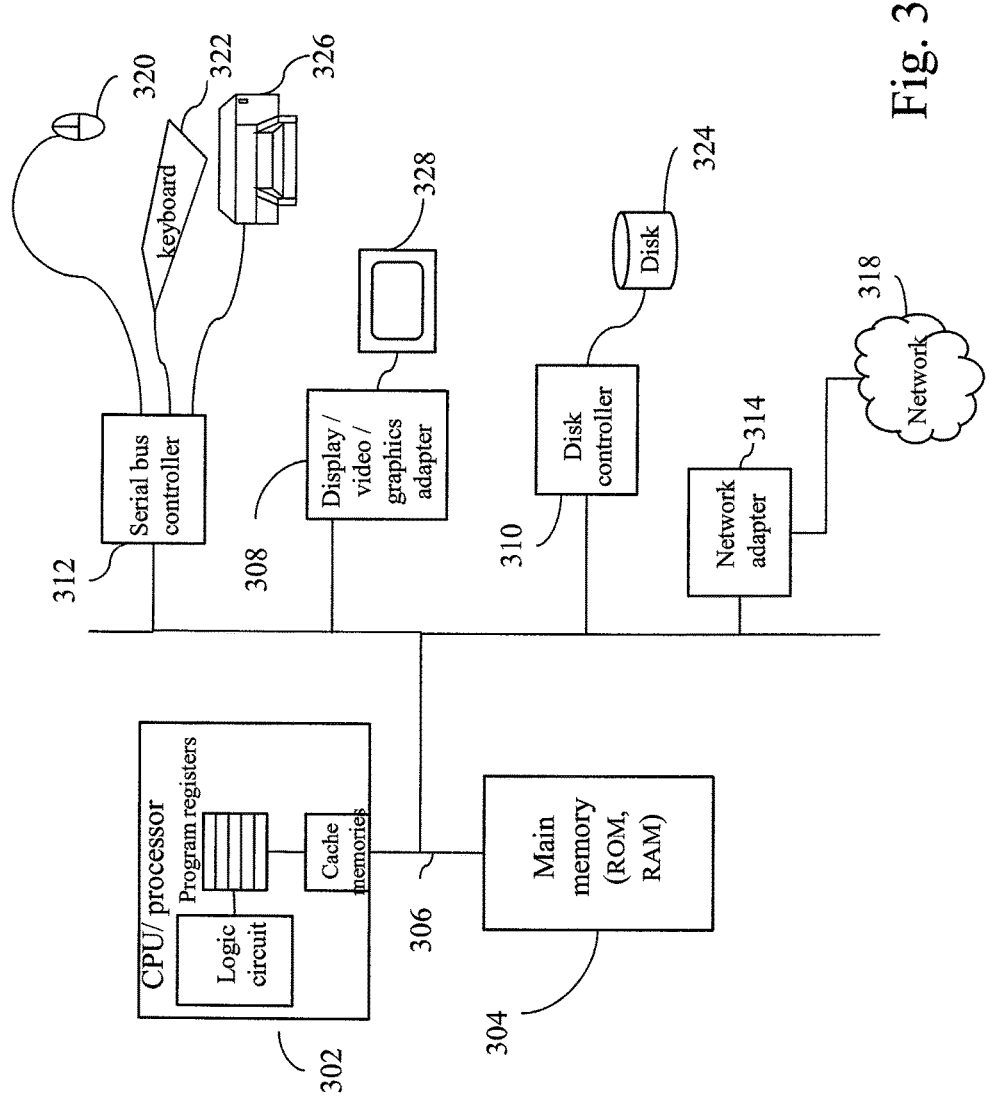
FIG. 3 illustrates an example of a computer system, in which the systems and methodologies of the present disclosure may be carried out or executed.

FIG. 3 illustrates an example computer system that may implement the system and/or method of the present disclosure. One or more central processing units (CPUs) 302 may include logic circuit (e.g., arithmetic/logic unit (ALU) and/or other digital circuit), fast cache memory and/or registers and/or register file and/or others. Registers are small storage devices; register file may be a set of multiple registers. Caches are fast storage memory devices, for example, comprising static random access (SRAM) chips. Caches serve as temporary staging area to hold data that the CPU 302 uses. There may be several levels of cache memories. Shown is a simplified hardware configuration. CPU 302 may include other combination circuits and storage devices. One or more central processing units (CPUs) 302 execute instructions stored in memory 304, for example, transferred to registers in the CPU 302. Buses 306, for example, are electrical wires that carry bits of data between the components. Memory 304 may include an array of dynamic random access memory (DRAM) chips, and store program and data that CPU 302 uses in execution. The system components may also include input/output (I/O) controllers and adapters connected to the CPU 302 and memory 304 via a bus, e.g., I/O bus and connect to I/O devices. For example, display/graphic adapter connects 308 a monitor 328 or another display device/terminal; disk controller 310 connects hard disks 324, for example, for permanent storage; serial controller 312 such as universal serial bus (USB) controller may connect input devices such as keyboard 322 and mouse 320, output devices such as printers 326; network adapter 314 connects the system to another network, for example, to other machines. The system may also include expansion slots to accommodate other devices to connect to the system. For example, a hard disk 324 may store the program of instructions and data that implement the above described methods and systems, which may be loaded into the memory 304, then into the CPU's storage (e.g., caches and registers) for execution by the CPU (e.g., ALU, FPGA (field programmable gate array) and/or other combination circuit or logic). In another aspect, all or some of the program of instructions and data implementing the above described methods and systems may be accessed, and or executed over the network 318 at another computer system or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for migration testing, comprising:
   discovering, by a processor, configuration information associated with software installed on a production system;
   automatically generating a script, by the processor, for capturing data traffic from and to the software installed on the production system based on the configuration information, the script comprising one or more commands and one or more parameters with which to invoke the one or more commands, the one or more commands determined based on the automatically discovered configuration information for capturing the data traffic, the one or more commands being predetermined to be safe commands validated to not harm the production system and to run on the production system for capturing traffic, the one or more commands comprising an executable command that intercepts and displays network packet data being transmitted and received over a network to which the production system is attached;
   capturing data traffic of the software running on the production system by executing the script;
   extracting, from the data traffic, and storing, requests received in the software running on the production system and responses to the requests sent from the software running on the production system;
   synchronizing the production system and a test system to which the software is migrated, by synchronizing at least persistent data that components of the software use;
   running a migrated version of the software on the test system using the requests extracted from the captured data traffic, the requests simulating a role played by a user and another system for the production system, and capturing responses to the extracted requests;
   comparing the responses in the captured data traffic with responses from the migrated version of the software; and
   determining whether the responses in the captured data traffic and the responses from the migrated version of the software are substantially the same to confirm that read and write requests performed during running the migrated version of the software were performed correctly.

2. The method of claim 1, wherein the discovering step includes automatically discovering the configuration information utilizing an automated discovery tool.

3. The method of claim 1, wherein the generating step includes analyzing a placement and wave plan for migrating the software to select the traffic to be captured by the script.

4. The method of claim 1, wherein the script includes a command to encrypt the captured data traffic, a command to remove sensitive information from the captured data traffic, or a command to compress the captured data traffic, or combinations thereof.

5. The method of claim 1, wherein the generating step includes determining how to capture the traffic by using only pre-installed commands in the production system.

6. The method of claim 1, wherein the requests extracted from the captured data traffic are modified by address changes between the production system and the test system.

7. The method of claim 6, wherein the address changes are derived from a placement plan.

8. The method of claim 1, further including:
   capturing a state of the production system after the step of capturing of the traffic data;
   capturing a state of the test system after the step of running a migrated version of the software on a test system; and
   comparing the state of the production system and the state of the test system.

9. A non-transitory computer readable storage medium storing a program of instructions executable by a machine to perform a method of migration testing, comprising:
   discovering configuration information associated with software installed on a production system;
   automatically generating a script for capturing data traffic from and to the software installed on the production system using the configuration information, the script comprising one or more commands and one or more parameters with which to invoke the one or more commands, the one or more commands determined based on the automatically discovered configuration information for capturing the data traffic, the one or more commands being predetermined to be safe commands validated to not harm the production system and to run on the production system for capturing traffic, the one or more commands comprising an executable command that intercepts and displays network packet data being transmitted and received over a network to which the production system is attached;
   capturing data traffic of the software running on the production system by executing the script;
   extracting, from the data traffic, and storing, requests received in the software running on the production system and responses to the requests sent from the software running on the production system;

synchronizing the production system and a test system to which the software is migrated, by synchronizing at least persistent data that components of the software use;

running a migrated version of the software on the test system using the requests extracted from the captured data traffic, the requests simulating a role played by a user and another system for the production system, and capturing responses to the extracted requests;

comparing the responses in the captured data traffic with responses from the migrated version of the software; and determining whether the responses in the captured data traffic and the responses from the migrated version of the software are substantially the same to confirm that read and write requests performed during running the migrated version of the software were performed correctly.

10. The non-transitory computer readable storage medium of claim 9, wherein the discovering step includes automatically discovering the configuration information utilizing an automated discovery tool.

11. The non-transitory computer readable storage medium of claim 9, wherein the generating step includes analyzing a placement and wave plan for migrating the software to select the traffic to be captured by the script.

12. The non-transitory computer readable storage medium of claim 9, wherein the script includes a command to encrypt the captured data traffic, a command to remove sensitive information from the captured data traffic, or a command to compress the captured data traffic, or combinations thereof.

13. The non-transitory computer readable storage medium of claim 9, wherein the generating step includes determining how to capture the traffic by using only pre-installed commands in the production system.

14. The non-transitory computer readable storage medium of claim 9, wherein the requests extracted from the captured data traffic are modified by address changes between the production system and the test system.

15. The non-transitory computer readable storage medium of claim 14, wherein the address changes are derived from a placement plan.

16. The non-transitory computer readable storage medium of claim 9, further including:
capturing a state of the production system after the step of capturing of the traffic data;
capturing a state of the test system after the step of running a migrated version of the software on a test system; and
comparing the state of the production system and the state of the test system.

17. A system for migration testing, comprising:
a script generating module operable to automatically generate a script for capturing data traffic from and to software installed on a production system, the script generating module automatically generating the script based on configuration information associated with software installed on a production system, the script comprising one or more commands and one or more parameters with which to invoke the one or more commands, the one or more commands determined based on the automatically discovered configuration information for capturing the data traffic, the one or more commands being predetermined to be safe commands validated to not harm the production system and to run on the production system for capturing traffic, the one or more commands comprising an executable command that intercepts and displays network packet data being transmitted and received over a network to which the production system is attached;
a processor operable to execute the script to capture data traffic of the software running on the production system; and
a storage module operable to store the captured data traffic,
the processor further operable to extract from the data traffic, and store in the storage module, requests received in the software running on the production system and responses to the requests sent from the software running on the production system,
the processor further operable to synchronize the production system and a test system to which the software is migrated, by synchronizing at least persistent data that components of the software use, to confirm that read and write requests performed during running a migrated version of the software were performed correctly.

18. The system of claim 17, further including:
a discovery module operable to automatically discover the configuration information associated with software installed on a production system.

19. The system of claim 17, further including:
a test system processor operable to run the migrated version of the software on a test system using the requests extracted from the captured data traffic, the requests simulating a role played by a user and another system for the production system.

20. The system of claim 19, further including a comparison module operable to compare the responses in the captured data traffic with responses from the migrated version of the software and determine whether the responses in the captured data traffic and the responses from the migrated version of the software are substantially the same.

21. The system of claim 20, wherein the processor is further operable to capture a state of the production system after capturing data traffic of the software running on the production system, and the test system processor is further operable to capture a state of the test system after running a migrated version of the software on a test system using requests extracted from the captured data traffic, the comparison module being further operable to compare the state of the production system and the state of the test system.

22. The system of claim 17, wherein the a script generating module is further operable to analyze a placement and wave plan for migrating the software to select the traffic to be captured by the script.

23. The system of claim 17, wherein the script includes a command to encrypt the captured data traffic, a command to remove sensitive information from the captured data traffic, or a command to compress the captured data traffic, or combinations thereof.

24. The system of claim 17, wherein the a script generating module is further operable to determine how to capture the traffic by using only pre-installed commands in the production system.

25. The system of claim 17, wherein the requests extracted from the captured data traffic are modified by address changes between the production system and the test system.

* * * * *